United States Patent [19]
Thompson

[11] Patent Number: 6,068,567
[45] Date of Patent: May 30, 2000

[54] TENSIONING DEVICE

[76] Inventor: Gene Thompson, 702 Day Street Rd., Montgomery, Ala. 36108

[21] Appl. No.: 09/106,107

[22] Filed: Jun. 29, 1998

[51] Int. Cl.⁷ ...................................................... F16H 7/08
[52] U.S. Cl. .......................... 474/111; 474/101; 474/109; 474/140
[58] Field of Search ................................... 474/111, 101, 474/109, 113, 134, 136, 137, 138, 132, 139

[56] References Cited

U.S. PATENT DOCUMENTS

| | | |
|---|---|---|
| 1,338,405 | 4/1920 | Stickney . |
| 2,210,276 | 8/1940 | Bremer . |
| 2,963,918 | 12/1960 | Blakstad . |
| 3,069,920 | 12/1962 | Cole et al. ............................... 474/111 |
| 3,295,383 | 1/1967 | Allen . |
| 3,602,054 | 8/1971 | Monteith et al. ........................ 474/109 |
| 3,673,884 | 7/1972 | Southiere . |
| 3,926,063 | 12/1975 | Mayfield . |
| 3,941,006 | 3/1976 | Brodesser . |
| 4,068,535 | 1/1978 | Sheets . |
| 4,337,055 | 6/1982 | Mackay et al. ......................... 474/111 |
| 4,662,862 | 5/1987 | Matson . |
| 4,798,562 | 1/1989 | Matson et al. . |
| 4,850,934 | 7/1989 | Gibson, Jr. et al. . |
| 5,000,724 | 3/1991 | Reid . |

FOREIGN PATENT DOCUMENTS 353797   8/1931   United Kingdom .

*Primary Examiner*—David A. Bucci
*Assistant Examiner*—Marcus Charles
*Attorney, Agent, or Firm*—Dickinson Wright PLLC

[57] ABSTRACT

A tensioning device for flexible drive elements such as chains or belts comprises a pair of opposing guide blocks and a connecting and tensioning assembly for spacing the guide blocks from each other. The guide blocks are slotted to receive the runs of the drive element. The assembly includes a pair of retainers which are connected together by rods and fasteners. Springs are positioned between each guide block and its respective retainer to bias the blocks toward each other. Each retainer is pivotally attached to its respective guide block to permit oscillating or pivoting movement while the drive element travels through the guide slots. The rods and fasteners permit adjustment of the spacing between the guide blocks to adjust the tension on the drive element.

17 Claims, 2 Drawing Sheets

TENSIONING DEVICE

FIELD OF THE INVENTION

The present invention is directed to a tensioning device for flexible drive elements.

BACKGROUND ART

In the prior art, various devices have been proposed for tensioning flexible drive belts such as chains or the like. U.S. Pat. No. 4,068,535 to Sheets discloses such a device that includes a first idler assembly for engaging the slack run of a drive belt and a second idler assembly for engaging the drive run of the belt. Tensioning members are provided for adjusting the distance between the first idler assembly and the second idler assembly to a distance sufficient to cause the apparatus to maintain a position between the drive pulley and the driven pulley.

U.S. Pat. No. 2,963,918 to Blakstad discloses another chain or belt tensioning device wherein the device is arranged between the runs of the chain or belt. In this device, spring-influenced plungers cooperate with the two runs of the chain or belt for tensioning. The device is designed to be mounted to a surface adjacent the runs.

U.S. Pat. Nos. 4,662,862 and 4,798,562 to Matson and Matson et al. disclose other examples of tensioning devices. In the Matson patent, straps and engagement means are used to secure the tensioning members a select distance away from one another by means of a ratchet-like mechanism. The mechanism is arranged so that the force required to move the tensioning members toward one another is smaller than the force required to move the tensioning members away from one another. The Matson et al. patent also uses straps and positioning devices. The straps are perforated so as to align with posts in the tensioning members for spacing adjustment.

The devices noted above are not without their disadvantages. The Blakstad tensioner requires a surface adjacent the runs of the belt or chain. Adjusting the spacing in the Matson et al. and Matson devices is tedious due to the use of the perforated straps. Further, this device lacks any biasing means associated with the tensioning members to accommodate fluctuations in the belt or chain.

While the Sheets device is free-floating and uses springs as part of the device, this construction is rather complicated. Moreover, since Sheets uses pulleys to guide the drive elements, one or more of the drive elements can easily be displaced from the pulleys during movement.

In light of the deficiencies in prior art tensioning devices as discussed above, a need has developed to provide an improved tensioning device. In response to this need, the present invention provides an improved tensioning device which is free-floating, easily adjusted and capable of accommodating fluctuations in the drive runs of a flexible drive member.

SUMMARY OF THE INVENTION

Accordingly, it is a first object of the present invention to provide an improved tensioning device for flexible drive elements such as belts or chains.

Another object of the present invention is a tensioning element which is easily adjusted for tensioning purposes.

A further object of the invention is a tensioning element capable of oscillating or pivoting to accommodate fluctuations in the drive element member being tensioned thereby.

Other objects and advantages will be apparent from the following description.

In satisfaction of the foregoing objects and advantages, the tensioning device of the present invention comprises a pair of opposed guide blocks, each block having a slot therein to receive a run of a drive element. The device also includes a guide block connecting and tensioning assembly comprising a retainer pivotally attached to each guide block and a pair of connecting members linking the retainers together with the guide blocks positioned between the retainers. Stops arranged at or near the respective ends of the members permit adjustment of a spacing between the guide blocks for tensioning of the drive element.

Each guide slot can have a pair of race surfaces to accommodate drive elements of different widths, the two surface separated by steps, inclines or the like. The widths of the races can vary depending on the width of the drive elements contemplated for use with the device. Each retainer can have a pair of apertured flanges extending therefrom to receive the connecting members.

In one embodiment, the pivotal attachment between each guide block and each retainer further comprises at least one spring positioned between each respective retainer and guide block combination. Each retainer can have opposing pairs of block flanges with each block flange having a slot. A fastener, e.g., a screw, can extend through each slot and be attached to the guide block so that each fastener can travel within the slot. The at least one spring permits each guide block to pivot with respect to the retainer attached thereto. If desired, more than one spring can be used, e.g., a pair of springs. One end of each spring can be held in a recess in the retainer.

The connecting members can be threaded rods and each stop can be a nut threaded at or near one or both ends of each respective threaded rod. Adjusting the position of one or both nuts along each threaded rod permits changing the spacing between the guide blocks for tension adjustment. Preferably, each guide block is formed from a low friction material such as a nylon, a machined flourocarbon polymer or the like.

BRIEF DESCRIPTION OF THE DRAWINGS

Reference is now made to the drawings of the invention wherein.

DESCRIPTION OF THE PREFERRED EMBODIMENTS

Figure 1:
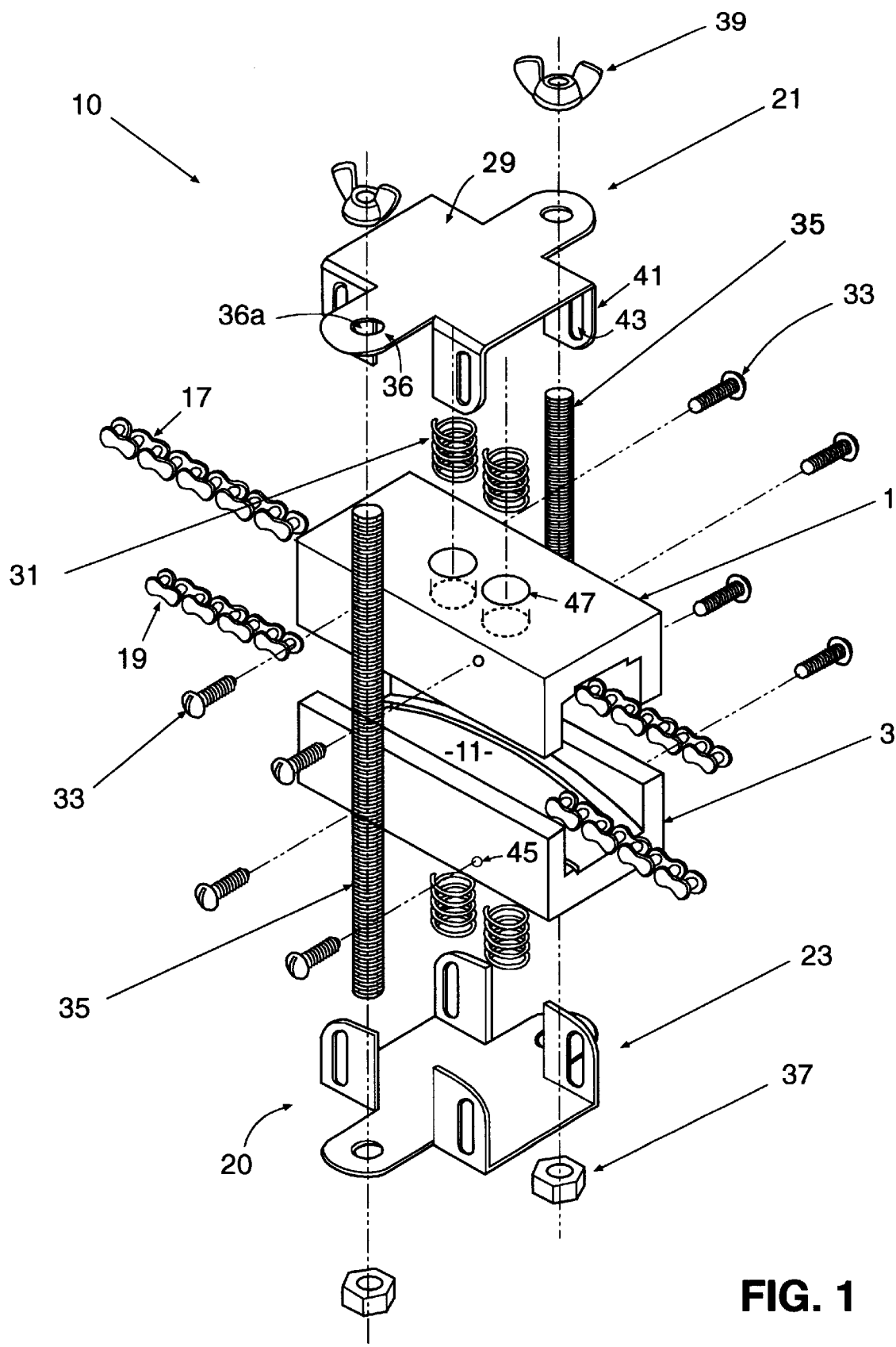
FIG. 1 is an exploded perspective view of one embodiment of the invention.
Figure 2:
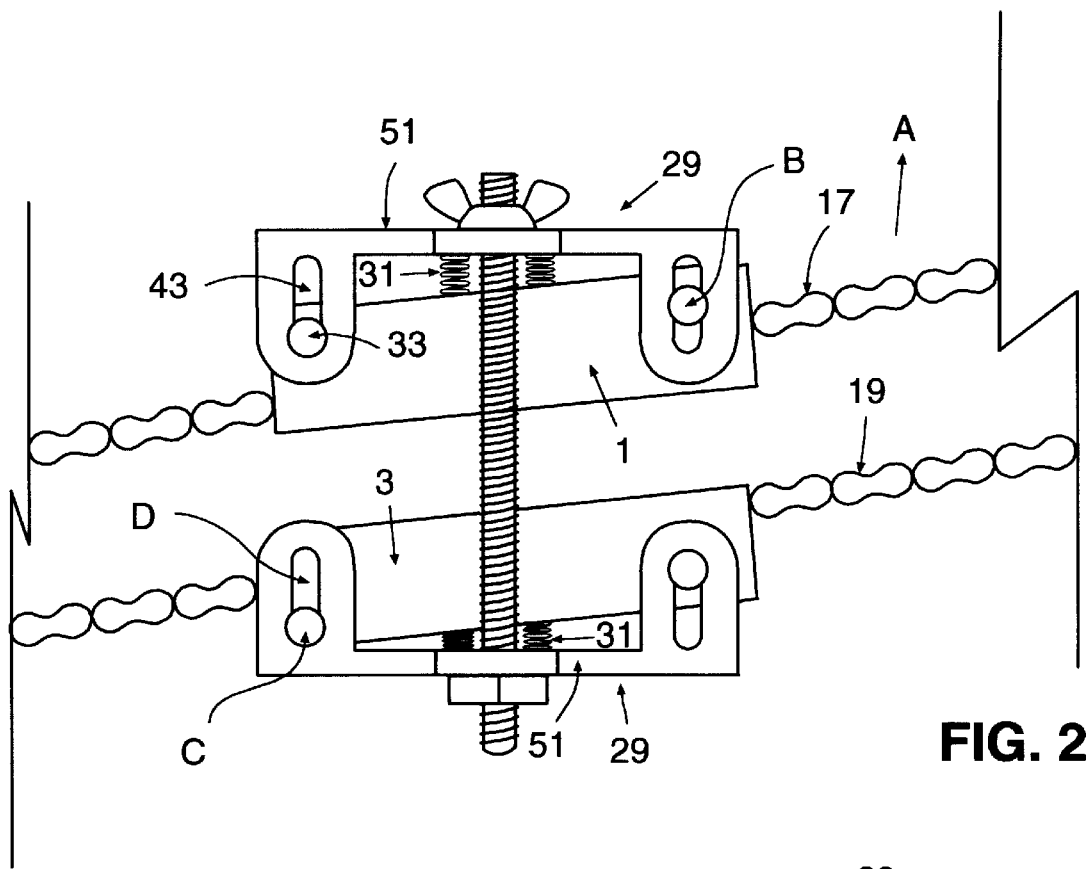
FIG. 2 is a side view of the embodiment of FIG. 1 in an exemplary use.
Figure 3:
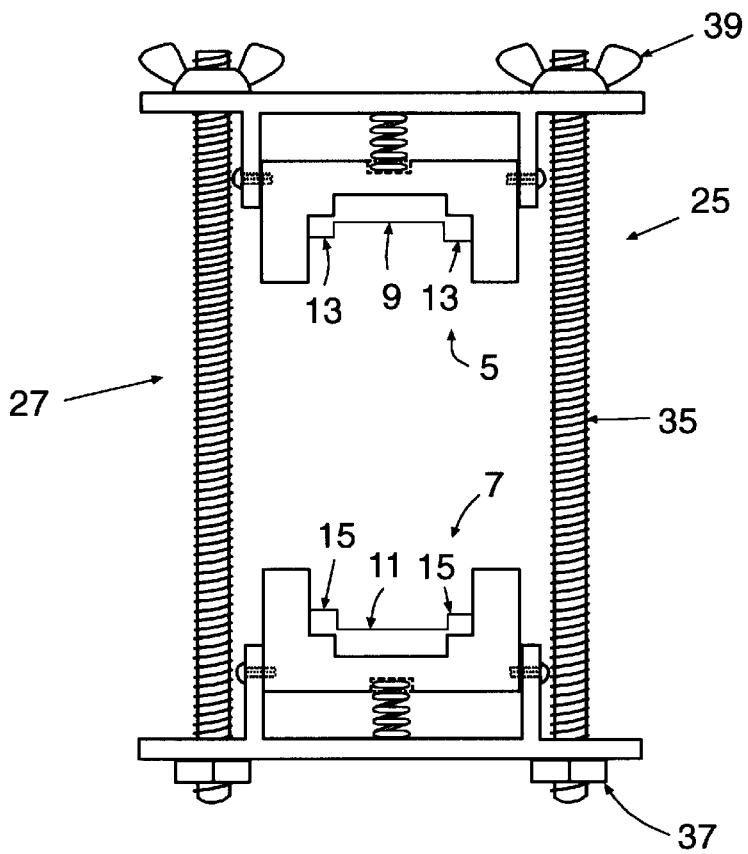
FIG. 3 is an end view of the FIG. 1 embodiment.

With reference to FIGS. 1–3, a first embodiment of the inventive tensioning device is generally designated by the reference numeral 10. The device includes a first guide block 1 and a second guide block 3. The guide blocks 1 and 3 are arranged so that their respective guide slots 5 and 7 face each other, see FIG. 3.

Each of the slots 5 and 7 are curved in shape, although they could be flat if so desired. Further, each slot is configured to have a pair of races to accommodate different sized flexible drive elements. Referring again to FIG. 3, slots 5 and 7 have respective inner races 9 and 11. By reason of the stepped configuration of the slots, each slot also has an outer race. The outer race accommodates a drive element which may not fit within the races 11 and 9. As shown in FIG. 3, the outer races are represented by the surfaces 13 and 15.

FIG. 1 depicts an example of a flexible drive element as two runs of a chain, 17 and 19. The run 17 is shown riding on the race 9 with the run 19 engaging the race 11. It should be understood that another flexible drive element such as a belt or the like can be utilized with the invention.

The guide blocks can be made of any material but are preferably made of a low friction material. Examples include plastics or polymers such as nylon or machined blocks of a tetrafluoroethylene fluorocarbon polymers or fluorinated ethylene-propylene resins, e.g., Teflon®.

The guide blocks 1 and 3 are arranged in opposing relationship by a connecting and tensioning assembly designated by the reference numeral 20. The assembly 20 includes retainer assemblies 21 and 23 and connecting rod assemblies 25 and 27. Each of the retainer assemblies further comprises a retainer 29, springs 31 and screws 33.

Each connector assembly 25 and 27 comprises a threaded rod 35, a hex nut 37 and a wing nut 39. As will be described more fully below, the nuts 37 and 39 function as stops to connect the retainers 29 and first and second blocks 1 and 3 together and assist in tensioning adjustment.

Each retainer 29 has a pair of opposing rod flanges 36, each flange having an aperture 36a therethrough. Each aperture 36 is sized to slidably receive each threaded rod 35.

Each retainer 29 also includes opposing pairs of block flanges 41. Each block flange 41 has a slot 43 therethrough. Each respective fastener 33 extends through the slot 43 and is threadably attached to a respective guide block by a threaded opening 45.

Each spring 31 seats in a recess 47 arranged in each of the guide blocks 1 and 3.

The springs 31, block flanges 41 and screws 33 cooperate to permit the first and second guide blocks 1 and 3 to oscillate or pivot with respect to the retainers 29 as more fully described below.

The connecting rod assemblies 25 and 27 function to adjust the spacing between the guide blocks 1 and 3. With particular reference to FIG. 3, either or both of the nuts 37 and 39 can be positioned along the length of the rod 35 to change the spacing between the blocks 1 and 3. For example, if more tension is desired on the runs 17 and 19 of the drive element, the spacing between the guide blocks 1 and 3 can be decreased by clockwise rotation of either or both of the nuts 37 and 39. Similarly, counter-clockwise rotation of the nuts would lengthen the distance between the guide blocks 1 and 3 and reduce the tension on the runs 17 and 19.

The retainer assemblies 21 and 23, as noted above, allow for pivoting or oscillating movement of the first and second guide blocks 1 and 3 to accommodate movement in the runs 17 and 19. With reference to FIG. 2, the FIG. 1 embodiment is shown in an exemplary use to illustrate the pivoting or oscillating movement of the guide blocks 1 and 3 with respect to the retainers 29. When the blocks 1 and 3 are fully biased against a run that is not applying any force on the block, each screw 33 is positioned in the slot end furthest away from the retainer base 51. When tensioning the runs, the guide blocks 1 and 3 will move against the bias of the springs 31 and the screws 33 will move in the slots 43.

Should one of the runs of the flexible drive element fluctuate, the screw 33 can travel within the slot 43 so that the guide block can pivot oscillate with respect to the retainer 29. In FIG. 2, the run 17 is shown fluctuating in the direction "A" so that the screw identified as B travels in the slot 43 towards the base 51. In a similar action, the screw designated as "C" travels in the slot 43 to allow the guide block 3 to pivot with respect to the retainer 29. During the pivoting movement, one of the two springs 31 positioned between a respective block and retainer is more compressed than the other.

Alternatively, a fluctuation of the runs 17 and 19 in a direction opposite to "A" would cause the screw "C" to translate in the slot from its position shown in FIG. 2 to the location "D" with the other end of the guide block 3 pivoting toward the retainer base 51. A similar pivoting action would occur for block 1.

With the pivoting feature of the guide blocks 1 and 3 with respect to the retainers 29, the inventive tensioning device can accommodate fluctuations in the orientation of the runs 17 and 19 without undue interference thereto. The inventive tensioning device also provides a fast and efficient method of adjusting the spacing between the guide blocks 1 and 3 for tension adjustment. In addition, the two sets of races in each guide block slot offer even more flexibility in tensioning differently-sized drive elements.

It should be understood that the nuts shown in FIGS. 1–3 for retaining the rods in the guide block flanges are exemplary. Any type of stops can be employed to ensure that the rods remain engaged in the apertures 36 in the rod flanges. For example, the hex nut 37 could be permanently fastened to the retainer 29 so that only the wing nut 39 would rotate for spacing adjustment. Alternatively, a clamping mechanism could be used to act as a stop against the retainers 29. Yet another example, lock nuts could be used in place of the hex nut 37 and/or wing nut 39 so as to minimize any inadvertent travel of the nuts during tensioning device use.

The particular configuration of the retainer is also exemplary in that other shaped flanges could be utilized to facilitate connection to the rods as well as the guide blocks.

Although two springs are shown for each retainer-guide block combination, a single spring could be employed as well as three or more springs. Likewise, other fasteners or fastener types can be employed in substitution for the screws 33. Other modes of attachment of the retainers to the guide blocks can be selected as would be within the skill of the art.

As such, an invention has been disclosed in terms of preferred embodiments thereof which fulfills each and every one of the objects of the present invention as set forth above and provides new and improved tensioning device for flexible drive elements.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A tensioning device comprising:
 a) a pair of opposed guide blocks, each block having a slot therein to receive a run of a drive element; and
 b) a block connecting and tensioning assembly comprising:
  i) a retainer for each guideblock, wherein each said guideblock is moveably attached along a slot to the corresponding retainer;
  ii) a pair of connecting members linking the retainers together with the guide blocks positioned between the retainers; and
  iii) stops arranged adjacent ends of the connecting members for adjusting a spacing between the guide blocks for tensioning of the drive element.

2. The device of claim 1, wherein each guide slot has a pair of race surfaces to accommodate drive elements of different widths.

3. The device of claim 1, wherein each retainer has a pair of apertured flanges extending therefrom to receive the connecting members.

4. The device of claim 1, wherein the connecting members are threaded rods and each stop further comprises a nut threaded at an end of a respective threaded rod, movement of at least two of the nuts along the threaded rods adjusting the spacing between the guide blocks.

5. The device of claim 1, wherein each guide block is formed from a machined flourocarbon polymer.

6. The device of claim 1, wherein each connecting member is a rod.

7. The device of claim 4 wherein the nuts for each threaded rod further comprise a hex nut and a wing nut.

8. A tensioning device comprising:
   a) a pair of opposed guide blocks, each block having a slot therein to receive a run of a drive element; and
   b) a block connecting and tensioning assembly comprising:
      i) a retainer movably attached to each guide block;
      ii) a pair of connecting members linking the retainers together with the guide blocks positioned between the retainers; and
      iii) stops arranged adjacent ends of the connecting members for adjusting a spacing between the guide blocks for tensioning of the drive element, wherein at least one spring is provided between each respective retainer and guide block, and wherein each retainer has opposing pairs of block flanges, each block flange having a slot, whereby a fastener extends through each slot and is attached to the guide block so that each fastener can travel within the slot, the at least one spring and the slots permitting each guide block to pivot and move with respect to the retainer attached thereto.

9. The device of claim 8, wherein a pair of springs is arranged between each guide block and each retainer.

10. The device of claim 8 wherein each guide block has a recess to receive the at least one spring.

11. A tensioning device comprising:
   a) a pair of opposed guide blocks, each block having a slot therein to receive a run of a drive element; and
   b) a block connecting and tensioning assembly comprising:
      i) a retainer movably attached to each guide block, each retainer having a pair of apertured rod flanges and opposing pairs of block flanges, each block flange having a flange slot therethrough;
      ii) a pair of threaded connecting rods, ends of each connecting rod extending through the apertures in the rod flanges, ends of each connecting rod having nuts threaded thereon to link the retainers together with the guide blocks positioned therebetween; and
      iii) at least one spring arranged between each guide block and retainer and a fastener extending through each flange slot and being attached to the guide block, compression of the at least one spring and travel of each fastener in the slot permitting pivotal movement of the guide block with respect to the retainer.

12. The device of claim 11, wherein a pair of springs is arranged between each guide block and each retainer, and each guide block has a recess to receive an end of each spring of the pair.

13. The device of claim 12, wherein the retainers are secured to the guide blocks using screws.

14. The device of claim 12, wherein the rod flanges are generally perpendicular to the block flanges.

15. The device of claim 12, wherein each guide block is made of a low friction material.

16. The device of claim 15, wherein the low friction material is a fluorocarbon polymer and each guide block is machined.

17. The device of claim 12, wherein each guide block has a recess sized to receive one end of the at least one spring.

* * * * *